US008673519B2

(12) United States Patent
Becker et al.

(10) Patent No.: US 8,673,519 B2
(45) Date of Patent: Mar. 18, 2014

(54) AID FOR ELECTRICAL CONTACTING OF HIGH-TEMPERATURE FUEL CELLS AND METHOD FOR PRODUCTION THEREOF

(75) Inventors: Ines Becker, Nürnberg (DE); Cora Schillig, Orlando, FL (US)

(73) Assignee: Siemens Aktiengesellschaft, München (DE)

( * ) Notice: Subject to any disclaimer, the term of this patent is extended or adjusted under 35 U.S.C. 154(b) by 847 days.

(21) Appl. No.: 12/680,238

(22) PCT Filed: Sep. 26, 2008

(86) PCT No.: PCT/EP2008/062925

§ 371 (c)(1), (2), (4) Date: Mar. 26, 2010

(87) PCT Pub. No.: WO2009/043818

PCT Pub. Date: Apr. 9, 2009

(65) Prior Publication Data

US 2011/0262841 A1 Oct. 27, 2011

(30) Foreign Application Priority Data

Sep. 28, 2007 (DE) ......................... 10 2007 046 976

(51) Int. Cl.
*H01M 2/08* (2006.01)

(52) U.S. Cl.
USPC ............................ 429/510; 429/507; 429/508

(58) Field of Classification Search
USPC ......... 429/452–471, 507–511, 532–535, 497, 429/466; 156/89.12–89.28; 252/184; 427/207.1–208.8; 428/355 AC, 355 DP, 428/356
See application file for complete search history.

(56) References Cited

U.S. PATENT DOCUMENTS 6,379,831 B1 4/2002 Antol et al.
2003/0082973 A1* 5/2003 Yamamoto et al. ........... 442/149
2004/0081878 A1* 4/2004 Mardilovich et al. ........... 429/34
2004/0234830 A1 11/2004 Bronson et al.
2009/0061260 A1* 3/2009 Fleck et al. ..................... 429/12

FOREIGN PATENT DOCUMENTS

DE 102004047761 A1 4/2006
EP 1786056 A1 5/2007
JP 2005129514 A * 5/2005
WO WO 02074715 A1 9/2002
WO WO 2005117192 A1 12/2005
WO WO 2006035046 A2 * 4/2006

* cited by examiner

*Primary Examiner* — Nicholas P D'Aniello

(57) ABSTRACT

A double-sided adhesive metal-based tape for use as contacting aid for SOFC fuel cells is provided. The double-sided metal-based adhesive tape is suitable for simplifying the construction of cell bundles. The double-sided metal-based adhesive tape is used for electrical contacting of the cell connector with the anode and for electrical contacting of the interconnector of the fuel cells with the cell connector. A method for producing the double-sided adhesive metal-base tape is also provided.

11 Claims, 4 Drawing Sheets

1 2 17 16 15 20a 12 17 16 20b 20b 1 2 a)

b)

c)

AID FOR ELECTRICAL CONTACTING OF HIGH-TEMPERATURE FUEL CELLS AND METHOD FOR PRODUCTION THEREOF

GOVERNMENT CONTRACT

Development for this invention was supported in part by Contract No. DE-FC26-05NT42613, awarded by the United Stated Department of Energy. Accordingly, the United States Government may have certain rights to this invention.

CROSS REFERENCE TO RELATED APPLICATIONS

This application is the US National Stage of International Application No. PCT/EP2008/062925, filed Sep. 26, 2008 and claims the benefit thereof. The International Application claims the benefits of German application No. 10 2007 046 976.6 DE filed Sep. 28, 2007. All of the applications are incorporated by reference herein in their entirety.

FIELD OF INVENTION

The invention relates to an aid for electrical contacting of high-temperature fuel cells, as claimed in the claims. Furthermore, the invention also relates to an associated method for the production of such an aid for electrical contacting in particular of SOFC fuel cells.

BACKGROUND OF INVENTION

Several individual cells have to be electrically conductively connected in series in a generator in order to generate energy by means of SOFC technology. The number of cells used then determines the electrical potential and thus the output of the generator. The output of the generator should ideally correspond to the total output of the individual cells.

A typical SOFC generator is developed from several sub units, the stacks. The stacks are combined from bundles with individual SOFC cells.

In the prior art, the individual SOFC cells are adhered to nickel contactings with the aid of a nickel epoxy resin, which is labor-intensive. For SOFC generators in the megawatt (MW) class, the total costs for the nickel epoxide and the processing thereof are considerable.

This adhesive system is also problematical in terms of controlling the layer thickness, in terms of a difficult and unmanageable application of the resin and a necessary curing time. The previous manual application is not possible on a large scale. A cost reduction aspired to for mass production can hardly be achieved with this type of contacting.

EP 1 786 056 A1 already discloses methods and materials for the electrical contacting of electrodes to interconnector layers in the case of solid electrolyte fuel cells, in which the materials are loosened in epoxy resins and are applied to the contact points. Tapes and/or transfer films can be used here.

Furthermore, a high-temperature fuel cell in the form of an SOFC is known from U.S. Pat. No. 6,379,831, which has tubular fuel cells, which are contacted to one another by way of metal weaves. Finally, this also relates exclusively to tubular fuel cells. WO 2005/117192 A1 discloses the conception of High Power Density (HPD) fuel cells and fuel cell systems developed therewith, in which the fuel cells consist of adjacent Δ or triangular shapes. Stacking such fuel cells realizes an adequate electrical contacting by adding metallic woven and/or knitted matting therebetween. Mat-shaped contactings are known for instance from DE 10 2004 047 761 A1, with the mechanical production of so-called knitted fabrics being detailed there, which are then folded into corresponding cushion shapes, for the purpose of using the cushion as elastic contactings between individual fuel cells.

As mentioned, the total costs for the nickel epoxide and the processing thereof are not insignificant for SOFC generators in the MW class. New approaches and/or alternatives are therefore sought in order to solve previous problems so as to be able to produce cost-effective SOFC generator systems.

SUMMARY OF INVENTION

On this basis, the object of the invention is to create suitable aids for contacting high-temperature fuel cells. Furthermore, associated methods are to be provided for the production of these contacting aids.

The object is achieved in accordance with the invention by the totality of the features of the claims. An associated production method is specified in the claims. Developments of the inventive aid and the associated production method form the subject matter of the respective sub claims.

The subject matter of the invention is a double-sided adhesive metal tape, with which a significant simplification is achieved in comparison to the use of liquid adhesives. The particular advantage here is that a cost-effective production of the tape can take place without special tools, and that a simple application in the fuel cell stack can take place with the contacting aid thus created.

The metal-based adhesive tape, which is created with the invention, is used in particular to improve the operation in a fuel cell system designed in the manner of stack and to drastically reduce the costs for the connection between the cell connectors and cells. The invention allows the material costs to subsequently be reduced for the nickel adhesives used in the prior art. Advantageously, the new metal-based adhesive tape which is realized with nickel produces a 60 to 80% cost reduction compared with the nickel epoxide.

The inventive contacting aid is therefore embodied in particular as a nickel adhesive tape, which may be adhesive on both sides. The construction of cell bundles can therefore be clearly simplified. Essential advantages of the nickel adhesive tape in comparison to conventional contacting methods are a better control of the layer thickness and a cleaner and more accurate application without curing time and the potential for automation of large-scale fuel cell production. This applies in particular to High Power Density (HPD) fuel cells, in the so-called delta (Δ) design for instance.

The metal-based adhesive tape includes a thickness between 50 and 250 μm and a width between 2 and 200 mm, preferably between 3 to 150 mm, and may be nickel (Ni), copper (Cu), titanium, (Ti), aluminum (Al), or an alloy based on these materials specifically a nickel-chrome alloy, a nickel-titanium alloy, or a nickel-aluminum alloy.

BRIEF DESCRIPTION OF THE DRAWINGS

Further details and advantages of the invention result from the subsequent description of the Figures of exemplary embodiments with reference to the drawing in conjunction with the further subclaims, in which;

DETAILED DESCRIPTION OF INVENTION

In the figures, the same reference numbers refer to the same elements. In particular, FIGS. 1 to 3 are described together.

In a parallel German patent application by the applicant with the same priority and reference "fuel cell system", a fuel cell system is described, which is developed in accordance with the Δ principle and in which so-called hollow cords are used in various embodiments as contacting means. Such a fuel cell arrangement is shown by way of example in FIG. 1.

Figure 1:
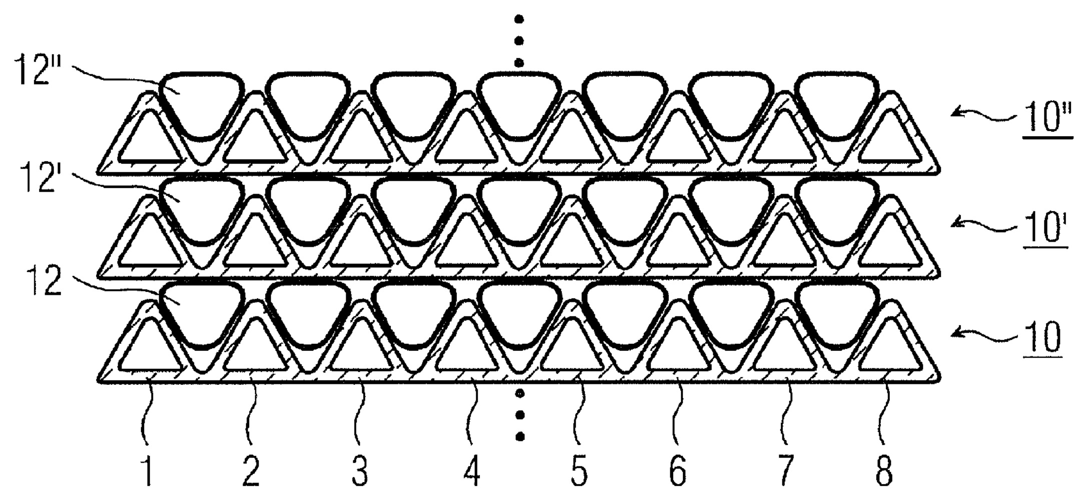
FIG. 1 shows a schematic representation of a cutout of a stack comprising several SOFC fuel cells with a Δ design and hollow cords for contacting purposes.
Figure 2:
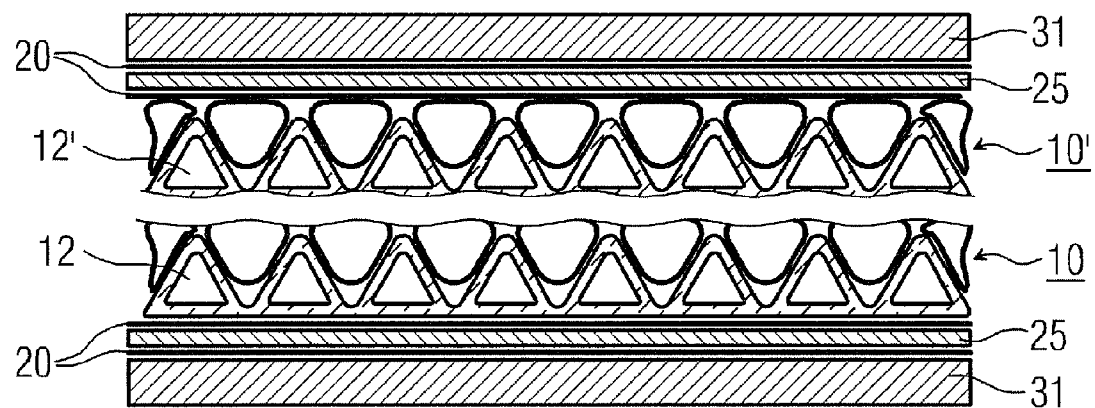
FIG. 2 shows a schematic representation of the construction of a bundle with Δ8 fuel cells and nickel rails for grounding purposes.
Figure 3:
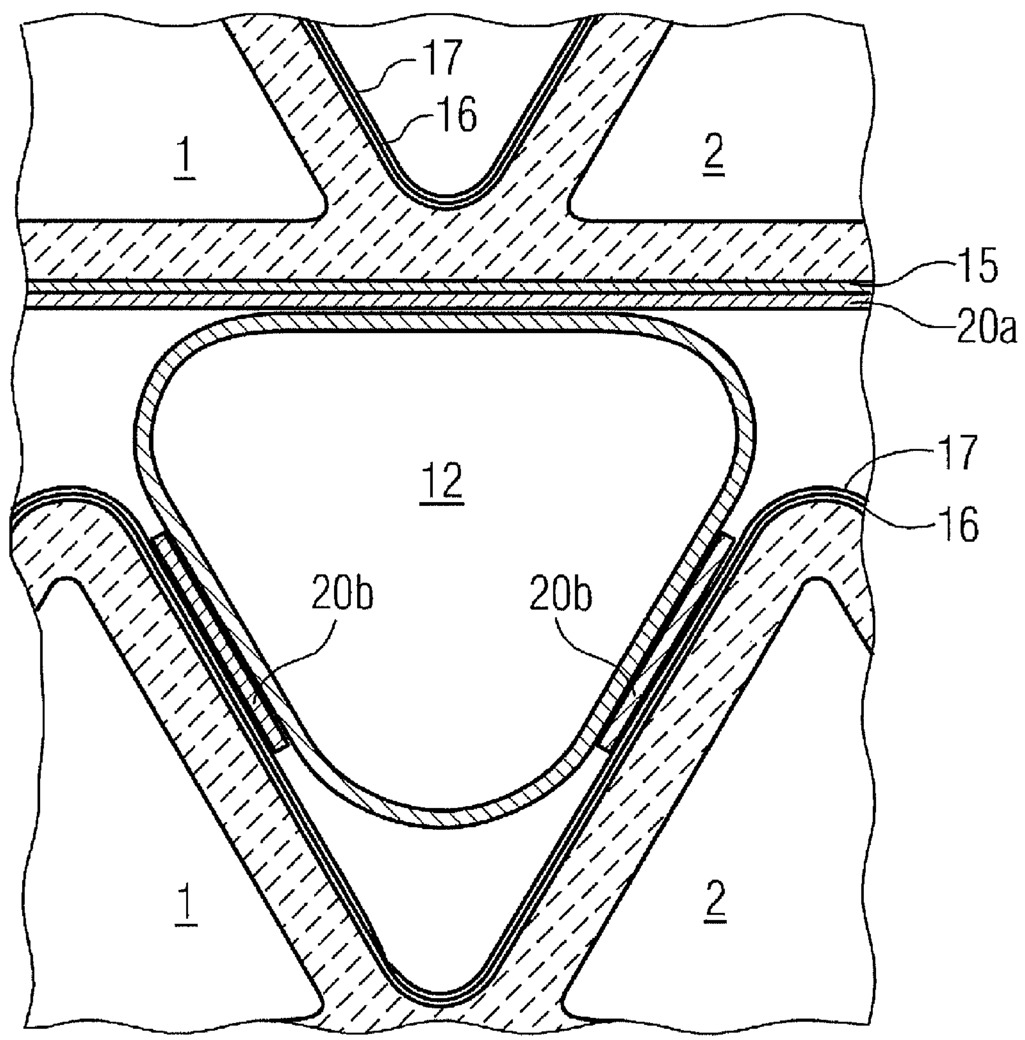
FIG. 3 shows a schematic representation of an enlargement from FIG. 1/2 with further details of the fuel cells and clarification of the aid for contacting purposes

Eight Δ channels 1 to 8 each form a Δ cell 10 in the FIGS. 1 and 2. Reference is made to the pertinent prior art in order to construct such cells made of cathodes, electrolytes and anodes, which are applied as functional layers to a ceramic element which operates as a cathode. The sequence of functional layers is clarified in the enlarged representation in FIG. 3. Reference character 15 refers here to an interconnector, reference character 16 to the electrolytes on the cathode support and reference character 17 to the anode on the electrolyte 16. The functional layers are instead not shown separately in the Figures, but are instead defined by the respective cells.

Several HPD cells known from the prior art are connected in the Δ design to form a bundle and are contacted. The interconnector 15 is located on the underside of each HPD fuel cell.

Nickel rails 31, 31' are arranged on both sides of the outer Δ cells. A nickel mat 25, 25' is disposed between the lower and upper nickel rails 31, 31' and the first and/or last cell for mechanical attenuation while maintaining the electrical properties.

For the conventional function in the complete bundle, the individual delta cells 10, 10', 10", . . . must be electrically contacted with one another, whereto suitable contact arrangements have to be provided in each instance between the anode and the interconnector usually available in the case of SOFC fuel cells. An additional condition here is that the electrical connection takes place such that mechanical forces can be received during a long-term operation of the fuel cell system with a varying temperature.

In FIG. 1, individual metal spiral beads or folded nickel knitted fabrics, which have the spring effect, are inserted in each instance into the Δ channels as hollow cords 12, 12', 12" . . . , which produce the electrical contact between the cells and are gas-permeable. The term "hollow cord" is understood here in particular to mean a tubular knitted fabric, with the knitted fabric having a free inner lumen for supplying gas and a predetermined wall thickness. Such a knitted fabric can be automatically manufactured from metallic wires with a predetermined diameter. Metal spiral beads made of wires with a predetermined diameter also come under the term "hollow cord".

With such a hollow cord, it is essential here that adequate mechanical properties, in particular in respect of elasticity, are therefore realized and good electrical contacting properties are on the other hand ensured. The inner lumen must also be suited to supplying combustion gas, as a result of which in particular the gas-permeable wall of the hollow cord is advantageous.

In FIGS. 1 to 3, the wire structures 12, 12' . . . are arranged across the whole axial length of the HPD cells in the trough of the Δ cells 1, 2, . . . . Contact-manufacturing elements based on nickel or copper can be used to fasten the hollow cords 12, 12' . . . to the associated interconnector 15 on the one hand and to the cell anodes 17 on the other hand.

An individual winding is shown in a simplified fashion as an individual wire in the sectional representations in FIGS. 1 to 3, which in this case form the hollow cord or consist of the tubular knitted wire mesh. The hollow cord and the surface of the delta cells are contacted to one another here as cell connectors, wherefor nickel epoxides are used in the prior art for instance.

A primary requirement of the nickel adhesive is to produce a uniform electrical contact between the cell connectors and the cell anode 17 on the one hand and the interconnector 15 on the other hand and to minimize the voltage loss between the cell connector and the cells.

For the construction of an Δ8 cell bundle, the nickel hollow cords are no longer fixed in the troughs of the first Δ cells and the interconnectors of the second Δ cells with a thin, double-sided adhesive nickel tape, as indicated in FIG. 3. Tapes of approximately 5 mm wide are needed for the two edges of the Δ cell, and tapes of approximately 150 mm wide are needed for the interconnector of the next cell. The tapes each run across the total length of the HPD cells, i.e. 750 to 1000 mm or for instance 750 to 1000 m.

For conventional use, the thin metal tapes, which have a strength of at least 50 μm and suitable electrical properties, must therefore be adherable on both sides prior to the temperature treatment in order to enable an accurately-fitting application. The metal tapes are to this end manufactured as double-sided adhesive tape.

A significant advantage of the double-sided adhesive tape is its simple handling, a homogenous layer thickness and the simple fixing of the cell connector to the adhesive tape, which affords the cell structure with a certain stability without the need for curing times. Commercially available adhesive tapes made of nickel in most cases have alloy materials and only a one-sided adhesive effect, which does not show any progress with the nickel epoxide in terms of cell structure. Individually manufactured (rolled) nickel tapes with a double-sided adhesive effect are considerably more expensive compared with nickel epoxide and are too thick for the conventional application. The metal tape used here is designed as a double-sided adhesive band, which is embodied with the required layer thickness and with the desired adhesiveness. These properties can be achieved by different transfer and dispersion adhesives.

Figure 4:
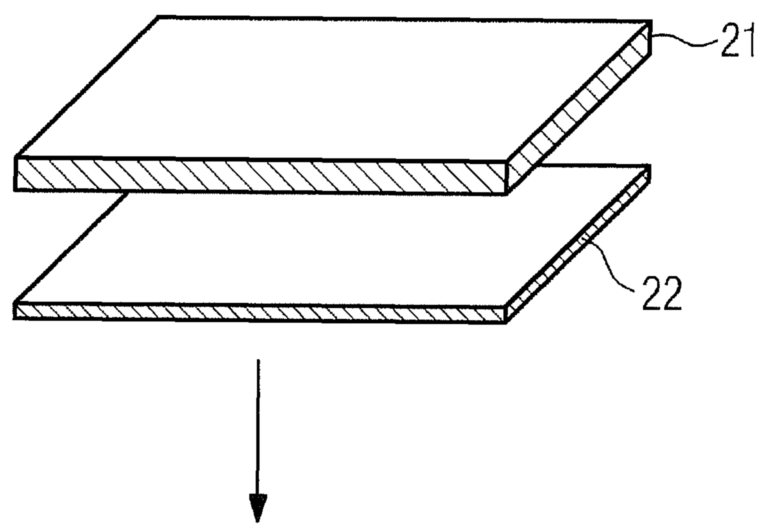
FIG. 4 shows a schematic representation of an exploded view of the stages of production of the inventive contacting means and FIG. 5 shows a schematic representation of a nickel tape hollow cord connection for the conventional use on the side of a Δ8 fuel cell with an enlarged metallographic polished section of the metallic connection of the hollow cord to the nickel tape.
Figure 4:
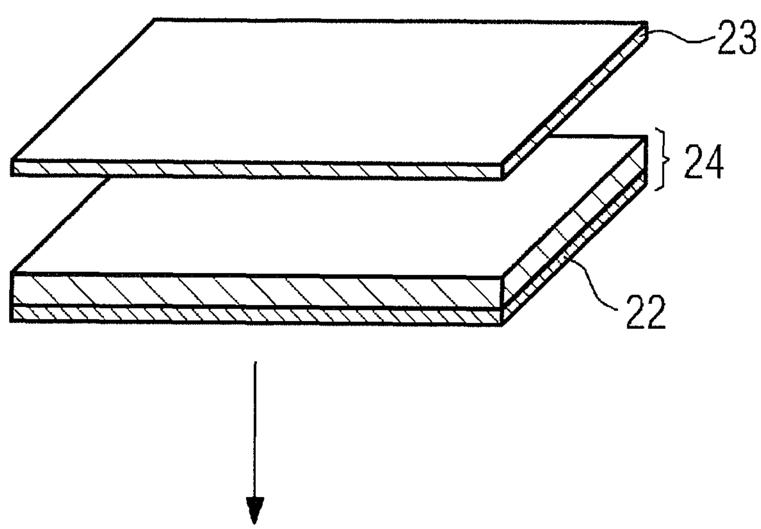
Figure 4:
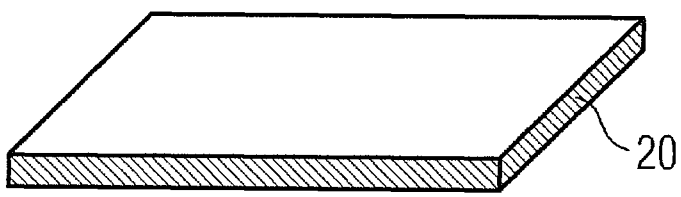

FIG. 4 shows the production of the double-sided nickel adhesive tape on the basis of the sub figures a, b and c. To this end, in step a), nickel powder is elutriated and homogenized in distilled water with the aid of a dispersing means. After homogenously mixing in the tumbling mixer, a dispersion adhesive (acrylate) is added, mixed again and the slurry thus produced is spread onto a transfer adhesive tape 22.

After drying the nickel-acrylate film 21, in step b) a dispersion adhesive 23 or a second transfer adhesive tape is again spread on and/or adhered to the top side of the layer 24 depending on requirements in order to increase the adhesive strength on this side. A higher nickel proportion normally results in a reduction in the adhesive strength, thereby contributing to the need to apply an additional adhesive layer in a further step.

After drying, the tape 20 can be cut into the required geometries and adhered to delta cells. Sub FIG. 4*c*) shows the finished adhesive tape, which is realized after cauterizing a porous body with a porosity between 40 and 80%, for instance 50%.

With the described method, double-sided nickel adhesive tapes can be easily produced in different lengths and widths. Such adhesive tapes are particularly suited to applications in particular in Δ cells. The necessary sintering process can take place here "in situ" when constructing the fuel cell, as a result of which the required electrical and mechanical properties are achieved.

Figure 5:
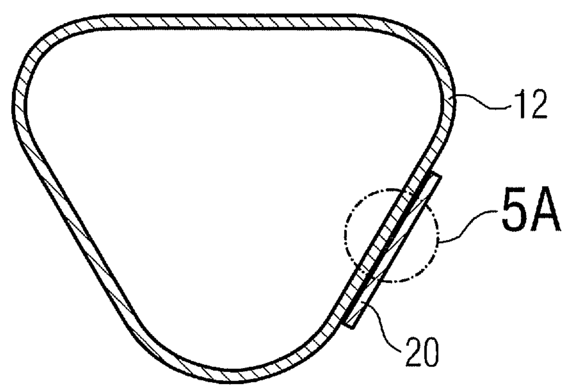
Figure 5A:
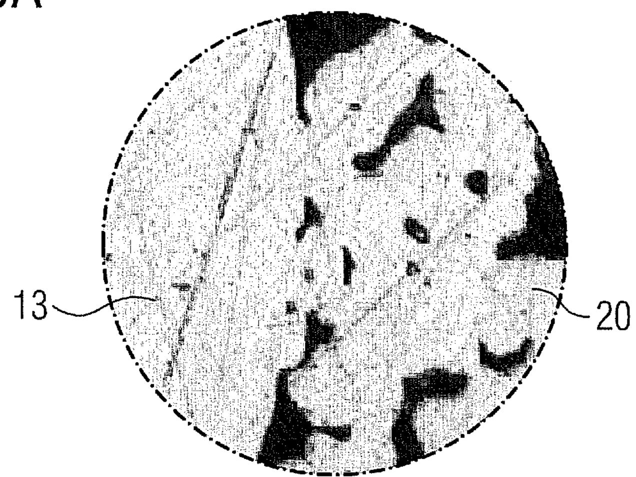

FIG. 5 shows that nickel adhesive tapes 20 produced using the described method can be advantageously used to develop SOFC fuel cells, which are designed as HPD cells in accordance with the Δ design. This depends on the production of a permanent electrical connection between the cell connector 13 embodied as a hollow cord and the fuel cell anode 17, wherefore the metal adhesive tape 20 is used as an aid.

In the appropriate enlargement, the polished section indicates that after a sintering process at approximately 1000° C., a material connection exists between at least one wire of the hollow cord 12 and the porous nickel region 20 and an electrical contacting is thus achieved. Similarly, the elastic properties of the cell connection nevertheless remain to the required degree.

A confirmation of the required properties takes place by means of electrical measurements. For the electrical resistance measurement, knitted fabric hollow cords made of nickel wire were adhered between two nickel components in the delta geometry with the aid of the nickel adhesive tape and heated to 1000° C. The resistance measurement took place in a four-point measurement. The results confirm that the target value of 1 mΩ has been reached.

The invention claimed is:

1. An arrangement for electrical contacting of high-temperature fuel cells, comprising:
- a double-sided metal-based adhesive tape; and
- a plurality of fuel cells each including an anode and an interconnector located underneath each fuel cell,
- wherein a first anode of a first fuel cell is connected to an interconnector of a second fuel cell using a contacting element,
- wherein a cell connector is used as the contacting element, and
- wherein the double-sided metal-based adhesive tape is directly electrically connects the cell connector with the first anode and directly electrically connects the interconnector of the second fuel cell with the cell connector.

2. The arrangement as claimed in claim 1, wherein the metal-based adhesive tape includes a thickness between 50 and 250 μm.

3. The arrangement as claimed in claim 1, wherein the metal-based adhesive tape has a width between 2 and 200 mm.

4. The arrangement as claimed in claim 3,
- wherein the metal-based adhesive tape is embodied for use between an edge of a delta cell and the anode, and
- wherein the metal-based adhesive tape includes a width of approximately 5 mm.

5. The arrangement as claimed in claim 4,
- wherein that the metal-based adhesive tape is embodied for use between an area of a delta cell and the interconnector of the fuel cells, and
- wherein the metal-based adhesive tape includes a width of approximately 150 mm.

6. The arrangement as claimed in claim 1, wherein the metal-based adhesive tape is nickel, copper, titanium, aluminum or an alloy based on these metals.

7. The arrangement as claimed in claim 6, wherein the base metal is a nickel-chrome alloy.

8. The arrangement as claimed in claim 6, wherein the base metal is a nickel-titanium alloy.

9. The arrangement as claimed in claim 6, wherein the base metal is a nickel-aluminum alloy.

10. The arrangement as claimed in claim 1, wherein the cell connector is a metallic hollow cord.

11. The arrangement as claimed in claim 1, wherein the cell connector is a metallic woven matting.

* * * * *